US007680786B2

(12) United States Patent
Koran

(10) Patent No.: US 7,680,786 B2
(45) Date of Patent: Mar. 16, 2010

(54) OPTIMIZATION OF TARGETED ADVERTISEMENTS BASED ON USER PROFILE INFORMATION

(75) Inventor: Joshua M. Koran, Mountain View, CA (US)

(73) Assignee: Yahoo! Inc., Sunnyvale, CA (US)

(*) Notice: Subject to any disclaimer, the term of this patent is extended or adjusted under 35 U.S.C. 154(b) by 386 days.

(21) Appl. No.: 11/590,354

(22) Filed: Oct. 30, 2006

(65) Prior Publication Data

US 2008/0104026 A1  May 1, 2008

(51) Int. Cl.
*G06F 17/30* (2006.01)

(52) U.S. Cl. .................. 707/5; 707/3; 707/4; 707/6; 705/14; 705/28; 705/27; 705/37

(58) Field of Classification Search .............. 707/3, 707/5, 6, 4; 705/14, 26, 27, 37
See application file for complete search history.

(56) References Cited

U.S. PATENT DOCUMENTS

| | | | |
|---|---|---|---|
| 2003/0050863 A1* | 3/2003 | Radwin | 705/27 |
| 2003/0055819 A1 | 3/2003 | Saito et al. | |
| 2005/0033641 A1* | 2/2005 | Jha et al. | 705/14 |
| 2005/0071328 A1* | 3/2005 | Lawrence | 707/3 |
| 2005/0222989 A1* | 10/2005 | Haveliwala et al. | 707/3 |
| 2005/0234897 A1* | 10/2005 | Cheng et al. | 707/3 |
| 2005/0240580 A1* | 10/2005 | Zamir et al. | 707/4 |
| 2006/0020596 A1* | 1/2006 | Liu et al. | 707/6 |
| 2006/0095336 A1* | 5/2006 | Heckerman et al. | 705/26 |
| 2006/0106709 A1* | 5/2006 | Chickering et al. | 705/37 |
| 2006/0106710 A1* | 5/2006 | Meek et al. | 705/37 |
| 2006/0123001 A1* | 6/2006 | Burns | 707/6 |
| 2006/0212350 A1* | 9/2006 | Ellis et al. | 705/14 |
| 2006/0259473 A1* | 11/2006 | Li et al. | 707/3 |
| 2007/0027850 A1* | 2/2007 | Chan et al. | 707/3 |
| 2007/0038508 A1* | 2/2007 | Jain et al. | 705/14 |
| 2007/0118432 A1* | 5/2007 | Vazirani et al. | 705/26 |
| 2007/0143260 A1* | 6/2007 | Markov et al. | 707/3 |
| 2007/0276801 A1* | 11/2007 | Lawrence et al. | 707/3 |
| 2008/0028067 A1* | 1/2008 | Berkhin et al. | 709/224 |

OTHER PUBLICATIONS

International Seatch Report for the related foreign application PCT/US2007/081565.
Written Opinion of the International Searching Authority for the related foreign application PCT/US2007/081565.

* cited by examiner

*Primary Examiner*—Jean B. Fleurantin
*Assistant Examiner*—Phong Nguyen
(74) *Attorney, Agent, or Firm*—Stattler-Suh PC

(57) ABSTRACT

A system and method to facilitate optimization of targeted advertisements based on user profile information are described. A set of event keywords associated with an event or action performed by the user or an agent of the user is identified in a data storage module. User profile information, if available, is further retrieved from the data storage module. A set of profile keywords is further identified from the retrieved user profile information and the set of profile keywords is compared to the set of event keywords based on predetermined business rules to determine a set of resulting keywords. Advertising information related to the set of resulting keywords is further retrieved from an advertising storage module. The retrieved advertisements are ranked based on one or more parameters within one or more keyword/advertisement matrices based on user, segment, or time parameters, and, finally, top ranked advertisements are transmitted to the user or the agent of the user for further display in connection with the requested content.

14 Claims, 9 Drawing Sheets

OPTIMIZATION OF TARGETED ADVERTISEMENTS BASED ON USER PROFILE INFORMATION

TECHNICAL FIELD

The present invention relates generally to the field of network-based communications and, more particularly, to a system and method to facilitate optimization of targeted advertisements transmitted over a network, such as the Internet, based on user profile information.

BACKGROUND OF THE INVENTION

The explosive growth of the Internet as a publication and interactive communication platform has created an electronic environment that is changing the way business is transacted. As the Internet becomes increasingly accessible around the world, users need efficient tools to navigate the Internet and to find content available on various websites.

Internet portals provide users an entrance and guide into the vast resources of the Internet. Typically, an Internet portal provides a range of search, email, news, shopping, chat, maps, finance, entertainment, and other content and services. Thus, the information presented to the users needs to be efficiently and properly categorized and stored within the portal.

SUMMARY OF THE INVENTION

A system and method to facilitate optimization of targeted advertisements based on user profile information are described. In some described embodiments, a set of event keywords associated with an event or action performed by the user or an agent of the user is identified in a data storage module. User profile information, if available, is further retrieved from the data storage module. A set of profile keywords is further identified from the retrieved user profile information and the set of profile keywords is compared to the set of event keywords based on predetermined business rules to determine a set of resulting keywords. Advertising information related to the set of resulting keywords is further retrieved from an advertising storage module. The retrieved advertisements are ranked based on one or more parameters and, finally, top ranked advertisements are transmitted to the user or the agent of the user for further display in connection with the requested content.

In alternate embodiments described below, a set of event keywords associated with an event or action performed by the user or an agent of the user is identified in the data storage module and advertisements related to the entire set of event keywords are retrieved from the advertising storage module. One or more matrices containing data related to the keywords, bid prices of the retrieved advertisements, click-through rate information (CTR) associated with the sponsored advertisements, and user profile information stored within the data storage module, are accessed in the data storage module. A set of filtered keywords and their corresponding filtered advertisements are further selected from the matrices. Finally, the filtered advertisements are further ranked based on one or more parameters, and top ranked advertisements are transmitted to the user or the agent of the user for further display in connection with requested content.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

Figure 1:
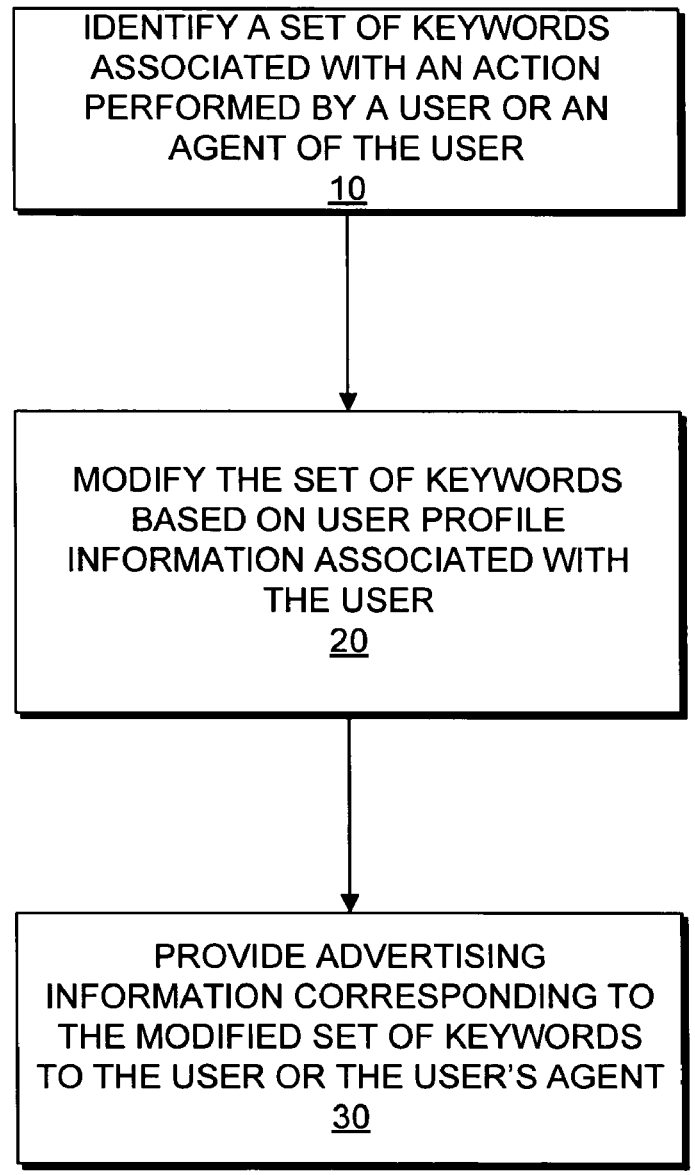
FIG. 1 is a flow diagram illustrating a processing sequence to facilitate optimization of targeted advertisements, according to one embodiment of the invention.

Actions or events initiated and input by a user or an agent of the user over a network, such as, for example, search queries, web page views, and/or advertisement clicks, are generally classified within predetermined respective categories and stored into a data storage module, such as, for example, a database or datastore.

Sponsored listings or advertisements targeted to the specific user are generally directed to the content entered by the user into a search box within a web page, or directed to the content related to the web page viewed by the user, or based on user's interests, as evidenced by one or more of the predetermined categories stored in the data storage module.

However, these methods for targeting sponsored advertisements to a specific user or agent of the user are applied independently, thus impeding an efficient determination of the appropriate advertising content to be shown to the user at any given time. The system and methods described in detail below enable optimization of targeted advertisements based on the user's profile information and either the most current search query, or the most recently viewed web page, or both. Moreover, information about the most recently viewed web page can be derived from the domain name, the page content, or both.

In some described embodiments, a set of event keywords associated with an event or action performed by the user or an agent of the user, such as, for example, a search query, the domain name or content available on a web page accessed by the user, is identified in a data storage module, such as, for example, a database or datastore. User profile information, if available, is further retrieved from the data storage module, the user profile information containing, for example, declared attributes and interests of the user compiled and stored in respective categories within the data storage module. A set of profile keywords is further identified from the retrieved user profile information and the set of profile keywords is compared to the set of event keywords based on predetermined business rules to determine a set of resulting keywords, as described in further detail below.

Advertising information related to the set of resulting keywords is further retrieved from an advertising storage module. The retrieved advertisements are ranked based on one or more parameters, such as, for example, the bid price established by advertiser entities, which submitted the advertisements, and, finally, top ranked advertisements are transmitted to the user or the agent of the user for further display in connection with the requested content.

In alternate embodiments described below, a set of event keywords associated with an event or action performed by the user or an agent of the user, such as, for example, either a search query, domain name or content available on a web page accessed by the user, is identified in the data storage module and advertisements related to the entire set of event keywords are retrieved from the advertising storage module. One or more matrices containing data related to the keywords, bid prices of the retrieved advertisements, click-through rate information (CTR) associated with the sponsored advertisements, and user profile information stored within the data storage module, are accessed in the data storage module. A set of filtered keywords and their corresponding filtered advertisements are selected from the one or more matrices, as described in further detail below. Finally, the filtered advertisements are further ranked based on one or more parameters, such as, for example, the bid price established by advertiser entities and associated click-through rates, and top ranked advertisements are transmitted to the user or the agent of the user for further display in connection with requested content.

FIG. 1 is a flow diagram illustrating a processing sequence to facilitate optimization of targeted advertisements, according to one embodiment of the invention. As shown in FIG. 1, at processing block 10, the sequence starts with identification of a set of keywords associated with an event or action performed by a user of an agent of the user. In one embodiment, an event is a type of action initiated by a user, typically through a conventional mouse click command. Events include, for example, search queries, web page views, sponsored listing clicks, and advertisement views. However, events, as used herein, may include any type of online navigational interaction or search-related events.

Generally, a page view event occurs when the user views a web page. In one example, a user may enter a music-related web page within an Internet portal by clicking on a link for the music category page. Thus, a page view event is classified as the user's view of the music category page. In one embodiment, the page view event may be classified by the text occurring on the web page, which includes one or more relevant page keywords. In addition, the co-occurrence or sequence of page view events may be used to classify a set of page view events. Moreover, the domain name of the page may be used (e.g., cheapmusic.com) to classify the web page.

A search query event occurs when a user submits one or more search terms within a search query to a web-based search engine. For example, a user may submit the query "Madonna tour", and a corresponding search query event containing the query keywords "Madonna" and "tour" is recorded. In response to a user query, a web-based search engine returns a plurality of links to web pages relevant to the corresponding search query keywords.

Next, referring back to FIG. 1, at processing block 20, the set of keywords, containing either page-related keywords or search query keywords, is modified based on profile information associated with the user. In one embodiment, user profile information is identified and retrieved from a data storage module, and the set of keywords is further expanded or filtered based on the retrieved user profile information, as described in further detail below.

Finally, the sequence continues at processing block 30 with transmittal of advertising information corresponding to the modified set of keywords to the user or the agent of the user, as described in further detail below.

Figure 2:
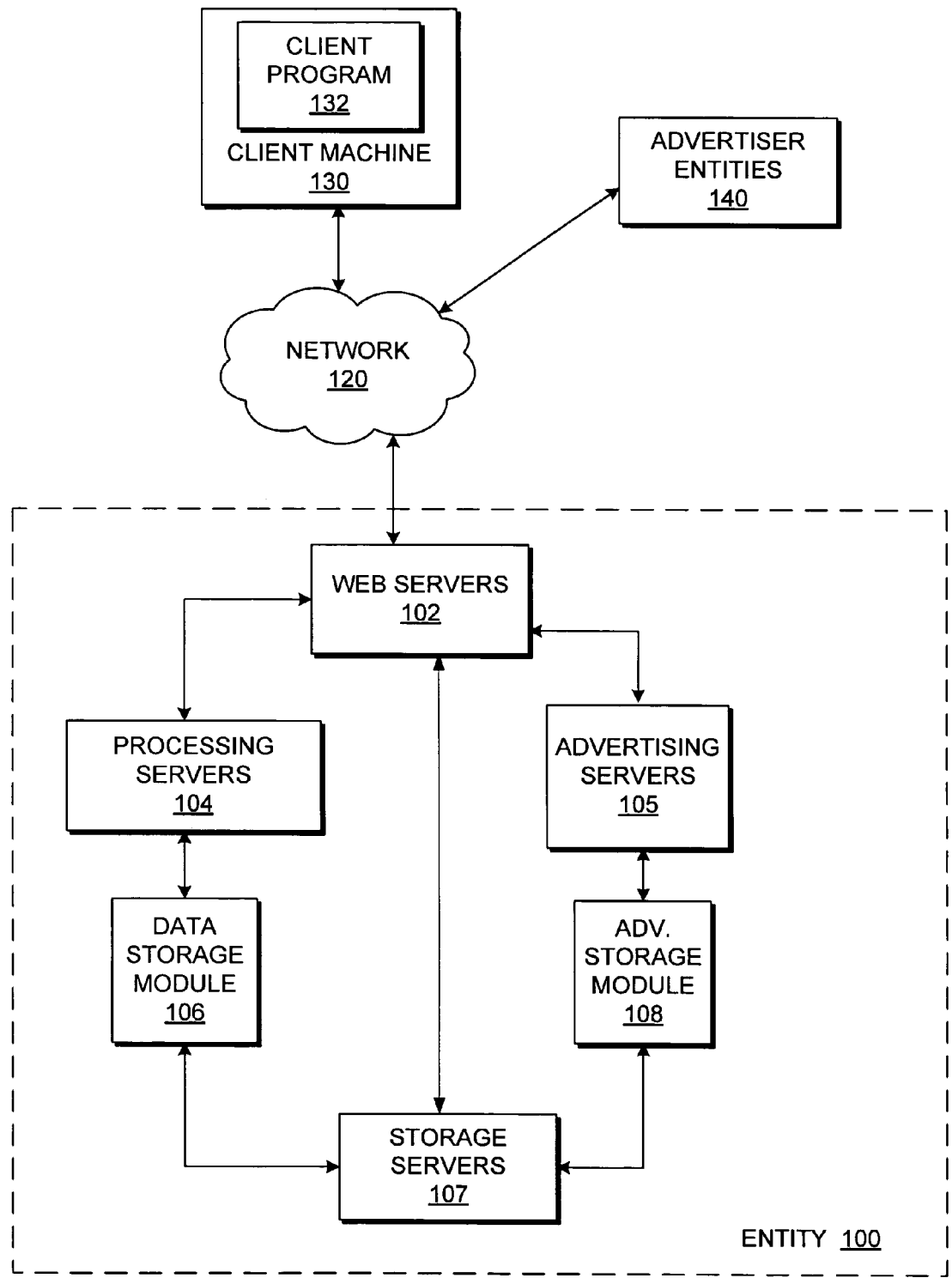
FIG. 2 is a block diagram illustrating an exemplary network-based entity containing a system to facilitate optimization of targeted advertisements based on user profile information, according to one embodiment of the invention.

FIG. 2 is a block diagram illustrating an exemplary network-based entity 100 containing a system to facilitate optimization of targeted advertisements based on user profile information. While an exemplary embodiment of the present invention is described within the context of an entity 100 enabling optimization of targeted advertisements, it will be appreciated by those skilled in the art that the invention will find application in many different types of computer-based, and network-based, entities, such as, for example, commerce entities, content provider entities, or other known entities having a presence on the network.

In one embodiment, the entity 100, such as, for example, an Internet portal, includes one or more front-end web servers 102, which may, for example, deliver web pages to multiple users, (e.g., markup language documents), handle search requests to the entity 100, provide automated communications to/from users of the entity 100, deliver images to be displayed within the web pages, deliver content information to the users, and other front-end servers, which provide an intelligent interface to the back-end of the entity 100.

The entity 100 further includes one or more back-end servers, for example, one or more processing servers 104, one or more advertising servers 105, and one or more data storage servers 107, such as, for example, database servers, each of which maintaining and facilitating access to one or more respective data storage modules, such as, for example, a data storage module 106 and an advertising storage module 108.

In one embodiment, the processing servers 104 are coupled to the data storage module 106 and are configured to facilitate optimization of targeted advertisements within the network-based entity 100, as described in further detail below. In one embodiment, the advertising servers 106 are coupled to the respective advertising storage module 108 and are configured to select and transmit content, such as, for example, advertisements, sponsored links, integrated links, and other types of advertising content, to users via the network 120, as described in further detail below.

In one embodiment, a client program 130, such as a browser (e.g., the Internet Explorer browser distributed by Microsoft Corporation of Redmond, Wash.), that executes on a client machine 132 coupled to the user or acting as an agent of the user, may access the network-based entity 100 via a network 120, such as, for example, the Internet. Other examples of networks that a client may utilize to access the entity 100 includes a wide area network (WAN), a local area network (LAN), a wireless network (e.g., a cellular network), the Plain Old Telephone Service (POTS) network, or other known networks. The network-based entity 100 may also be accessed over the network 120 by advertiser entities 140, which provide the advertisements, sponsored links, integrated links, and other types of advertising content to be stored within the advertising storage module 108.

Figure 3:
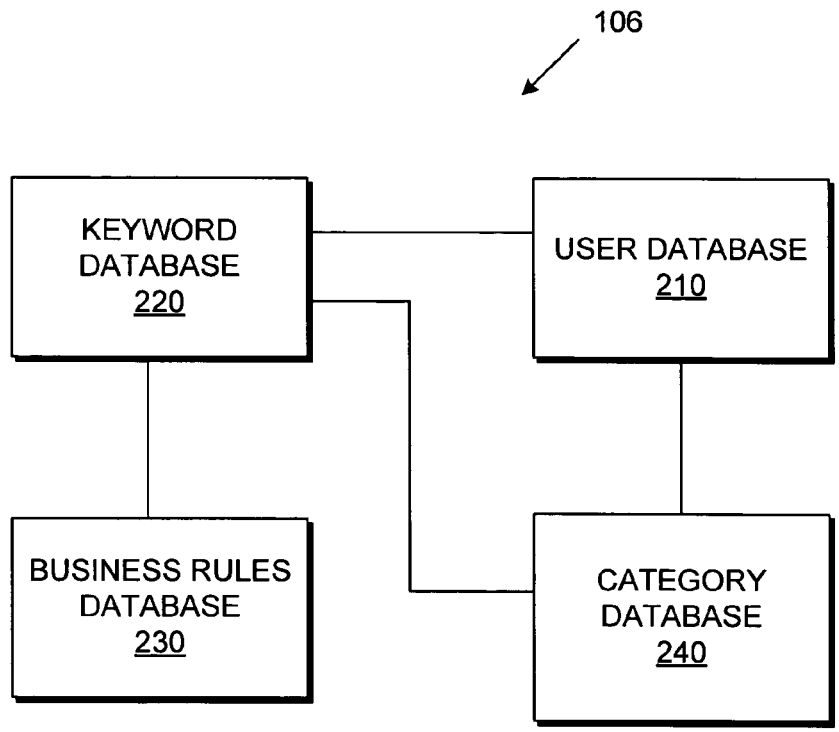
FIG. 3 is a block diagram illustrating a data storage module, such as, for example, a database, which at least partially implements and supports the network-based entity, according to one embodiment of the invention.

FIG. 3 is a block diagram illustrating a data storage module 106, which at least partially implements and supports the network-based entity 100, according to one embodiment of the invention. As shown in FIG. 3, in one embodiment, the data storage module 106 may be a database or collection of databases, which may be implemented as a relational database, and may include a number of tables having entries, or records, that are linked by indices and keys. Alternatively, the data storage module 106 may be implemented as a collection of objects in an object-oriented database, as a distributed database, or any other such databases.

As illustrated in FIG. 3, in one embodiment, the data storage module 106 includes multiple storage facilities, such as, for example, multiple databases or, in the alternative, tables within a database, of which facilities specifically provided to enable an exemplary embodiment of the invention, namely a user database 210, a keyword database 220, a business rules database 230, and a category database 240 are shown.

In one embodiment, the user database 210 contains a record for each user of the entity 100, such as, for example, a user profile containing user data which may be linked to multiple items stored in the other databases 220, 230, and 240 within the data storage module 106, such as, for example, user identification information, user account information, and other known data related to each user. The user identification information may further include demographic data about the user, geographic data detailing user access locations, behavioral data related to the user, such behavioral data being generated by a behavioral targeting system, which analyzes user events or actions in connection with the entity 100 and identifies interests of the user based on the analyzed events, and other identification information related to each specific user. In one embodiment, the stored data may also include short term behavior of the user or, in the alternative, long term behavior of the user, or an algorithmic combination of short term and long term behavior of the user.

In one embodiment, the keyword database 220 stores a list of single-word or multi-word keywords collected and updated automatically or, in the alternative, manually, from various servers within the entity 100, from editors associated with the entity 100, and/or from other third-party entities connected to the entity 100 via the network 120. The keywords stored within the keyword database 220 may include, for example, page keywords associated with web page views, query keywords associated with search queries received from users, and other keywords associated with events performed within the entity 100.

In one embodiment, the category database 240 stores multiple classification categories used to group the keywords stored within the keyword database 220. The categories stored within the category database 240 may be further organized into a hierarchical taxonomy, which is reviewed, edited, and updated automatically by the processing servers 104, or, in the alternative, manually by editors and/or other third-party entities. For example, the taxonomy may comprise a high-level category for "music," and several sub-categories, located hierarchically below the "music" category, and illustrating different genres of music. However, it is to be understood that any other representation of a taxonomy used to classify subject matter may be used, without deviating from the spirit or scope of the invention. In an alternate embodiment, the assigned classification categories may not be mapped into a hierarchical taxonomy and may instead be stored as a collection of categories within the database 240. In one embodiment, a "music" category stored within the database 240 may be linked to various music-related keywords stored within the database 220 and may also be linked to a user profile stored within the user database 210.

In one embodiment, the business rules database 230 stores predetermined processing rules to be applied during the optimization process to select and rank keywords accessed by the processing servers 104, as described in further detail below.

It is to be understood that the data storage module 106 may include any of a number of additional databases or tables, which may also be shown to be linked to the user database 210, the keyword database 220, the business rules database 230, and the category database 240, such as, for example, page databases, which store web page information related to the web pages transmitted to the user, or content databases, which store content information related to the stored web pages.

Figure 4:
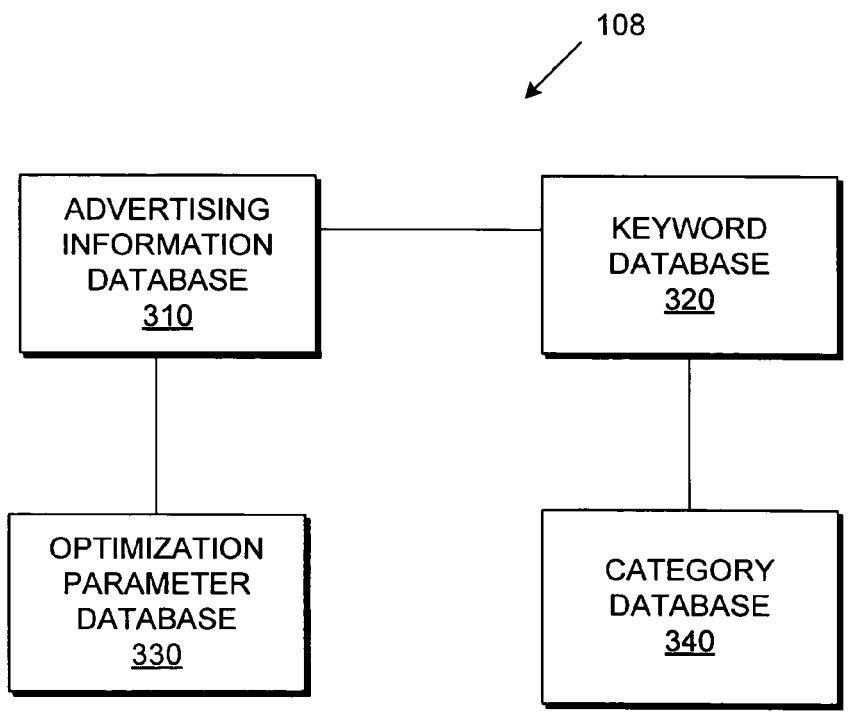
FIG. 4 is a block diagram illustrating an advertising storage module, such as, for example, a database, which at least partially implements and supports the network-based entity, according to one embodiment of the invention.

FIG. 4 is a block diagram illustrating an advertising storage module, which at least partially implements and supports the network-based entity, according to one embodiment of the invention. As shown in FIG. 4, in one embodiment, the advertising storage module 108 may be a database or collection of databases, which may be implemented as a relational database, and may include a number of tables having entries, or records, that are linked by indices and keys. Alternatively, the advertising storage module 108 may be implemented as a collection of objects in an object-oriented database, as a distributed database, or any other such databases.

As illustrated in FIG. 4, the advertising storage module 108 includes storage facilities, such as, for example, multiple databases or, in the alternative, tables within a database, of which facilities specifically provided to enable an exemplary embodiment of the invention, namely an advertising information database 310, an advertising keyword database 320, an optimization parameter database 330, and an advertising category database 340 are shown.

In one embodiment, the advertising information database 310 may store, for example, advertisements received from the advertiser entities 140 and content associated with the received advertisements. The advertising keyword database 320 may store advertising keywords associated with the advertisements received from the advertiser entities 140.

In one embodiment, the advertising category database 340 may contain, for example, multiple advertising categories used to group the advertisements received from the advertiser entities 140. The categories stored within the advertising category database 340 may be further organized into a hierarchical taxonomy, which is reviewed, edited, and updated automatically by the advertising servers 106, or, in the alternative, manually by editors and/or other third-party entities. In an alternate embodiment, the assigned advertising categories may not be mapped into a hierarchical taxonomy and may instead be stored as a collection of categories within the database 340.

In one embodiment, the optimization parameter database 330 further stores multiple parameters used to rank and select advertisements to be transmitted to the user, such as, for example, a bid price associated with each advertisement and provided by the advertiser entities 140, and one or more matrices containing optimization information, such as bid prices of the sponsored advertisements, click-through-rate information (CTR) associated with the sponsored advertisements, and user profile information stored within the data storage module 106, as described in detail below.

Figure 5A:
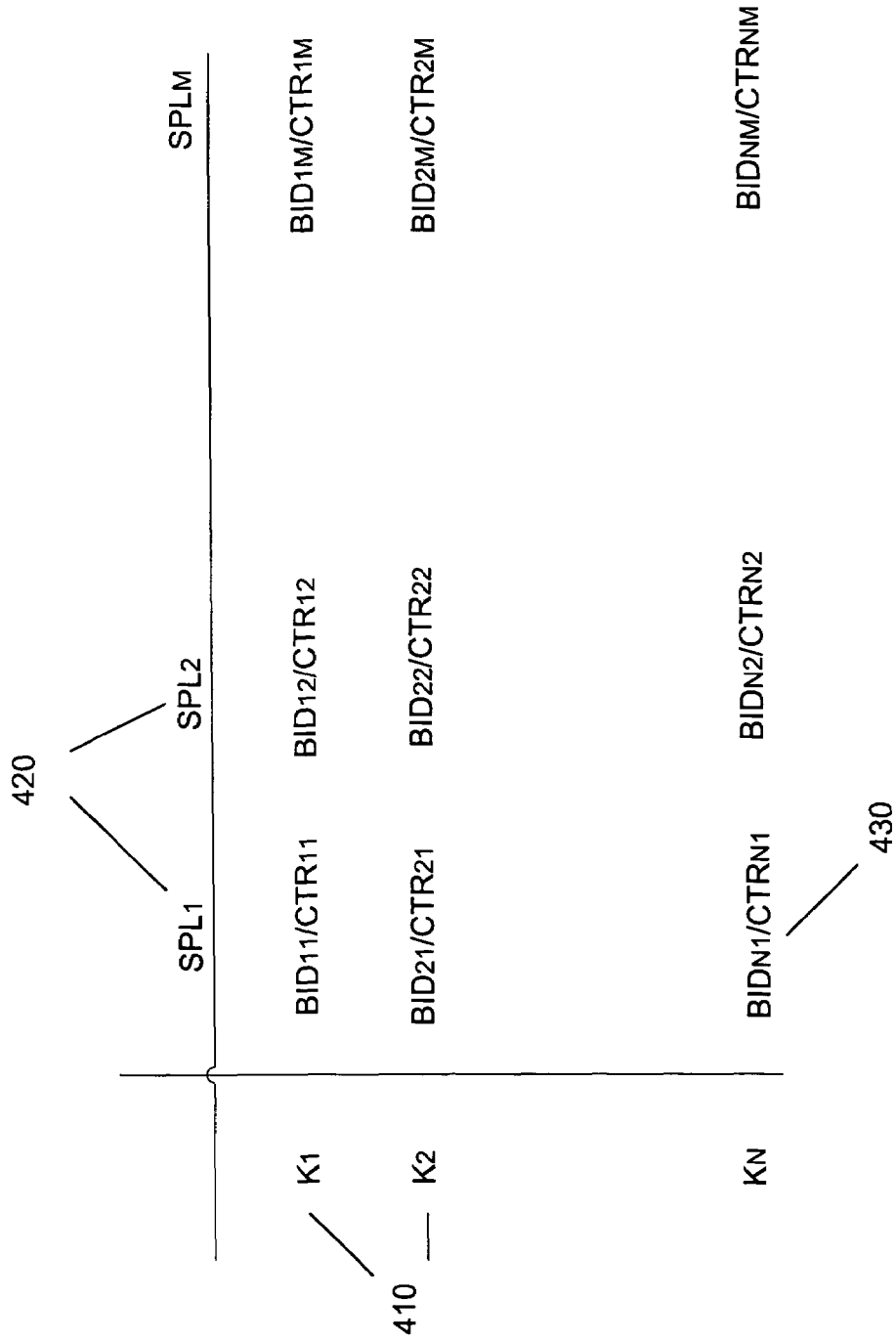
FIG. 5A is an exemplary illustration of a matrix stored within the advertising storage module, according to one embodiment of the invention.

FIG. 5A is an exemplary illustration of a matrix 400 stored within the optimization parameter database 330 of the advertising storage module 108, according to one embodiment of the invention. As shown in FIG. 5A, the matrix 400 includes information about keywords $K_1$ through $K_N$ 410 associated with corresponding information about the sponsored advertisements or listings $SPL_1$ through $SPL_M$ 420 received from the advertiser entities 140, which target the keywords $K_1$ through $K_N$ 410.

In one embodiment, for each pair $K_X/SPL_Y$, a bid price $BID_{XY}$ and a corresponding click-through-rate $CTR_{XY}$ are provided in appropriate positions within the matrix 400. In an alternate embodiment, a predetermined function may combine each $CTR_{XY}$ and $BID_{XY}$ pair to create a single number which can be compared across all cells of the matrix 400.

In one embodiment, the bid price $BID_{XY}$ is submitted by a respective advertiser entity 140 and is continuously updated by the advertiser entity 140 in response to market conditions and feedback from the entity 100. The corresponding click-through-rate $CTR_{XY}$ is calculated by the advertising servers 105 within the entity 100 for each sponsored advertisement 420 and is aggregated for all users of the entity 100, thus constantly changing based on the observed behavior of each user. For advertisers that have no historical click-through-rate CTR, a default CTR is provided. In one embodiment, the default CTR may be based on industry averages. The default CTR is combined with actual observed events based on one of many known weighting schemes, such that, for example, a statistically significant number of events must be observed to dramatically shift the value of the default CTR.

Figure 5B:
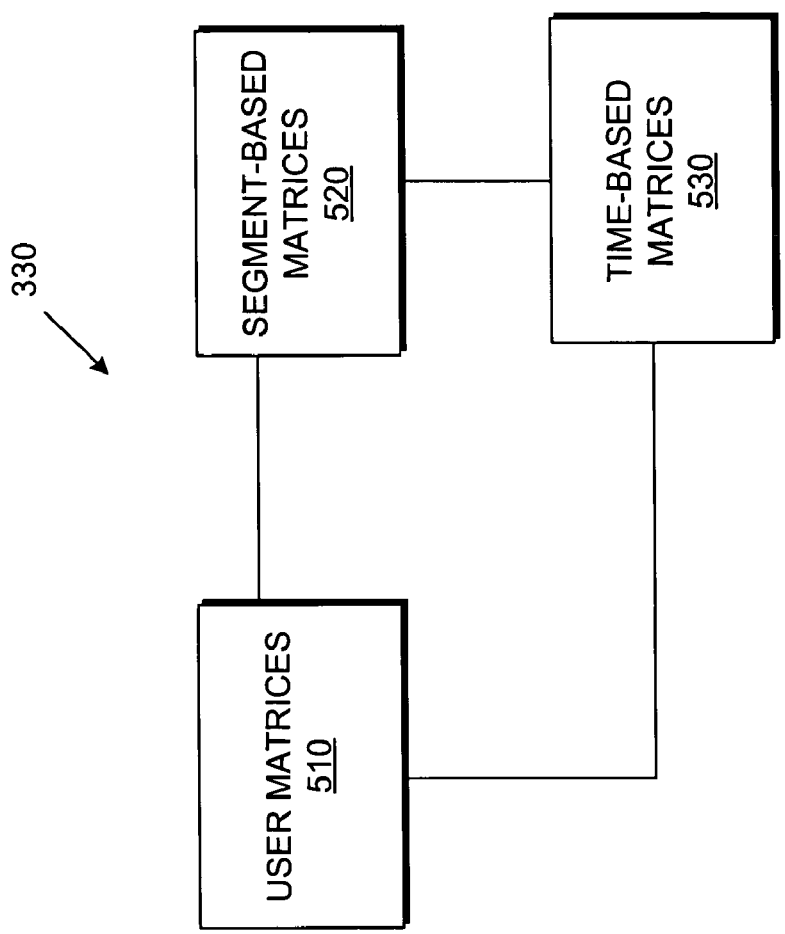
FIG. 5B is a block diagram illustrating an optimization parameter database within the network-based entity, according to one embodiment of the invention.

FIG. 5B is a block diagram illustrating an optimization parameter database 330 within the network-based entity 100, according to one embodiment of the invention. In one embodiment, the optimization parameter database 330 includes multiple matrices, similar to the matrix shown in connection with FIG. 5A, of which matrices specifically provided to enable an exemplary embodiment of the invention, namely user matrices 510, segment-based matrices 520, and time-based matrices 530, are shown in FIG. 5B.

The user matrices 510 are created for each individual user and contain corresponding click-through-rates (CTR) associated with each user. The segment-based matrices 520 include, for example, geographic-related matrices, demographic-related matrices, and/or gender-related matrices, and contain corresponding CTRs associated with each segment in a predetermined period of time. The time-based matrices 530 are assembled for each user to distinguish between new interests of each particular user and previous interests recorded for that user. In one embodiment, the CTRs contained in various cells within the user matrices 510, the segment-based matrices 520, and/or the time-based matrices 530 may be further compared across specific matrices and may be used to determine the final resulting advertisements to display to the user.

In one embodiment, information related to each user is contained within a single segment-based matrix 520, which is assembled based on a combination of segment-based attributes of each user (e.g., geographic and gender attributes) in a predetermined period of time, such as, for example, a matrix 520 clustering female users from California and their corresponding aggregated CTRs. Thus, the advertising servers 105 perform only one lookup within a respective matrix 520 per user search query or web page view in order to extract related advertisements.

In an alternate embodiment, information related to each user is contained within a single segment-based matrix 520, the matrices 520 being assembled based on observed permutations of segment-based attributes of each user (e.g., geographic/gender and gender/demographic) in a predetermined period of time, thus resulting in a larger number of matrices 520. In this embodiment, the advertising servers 105 perform only one lookup within a respective matrix 520 per user search query or web page view in order to extract related advertisements.

In another alternate embodiment, information related to each user is contained within multiple segment-based matrices 520, each matrix 520 being assembled based on a single segment-based attribute (e.g., geographic, demographic, or gender attribute) in a predetermined period of time, such as, for example, respective matrices 520 clustering female users and male users, as well as their respective aggregated CTRs. Thus, the advertising servers 105 must perform multiple lookups within respective matrices 520 per user search query or web page view in order to extract related advertisements and must further combine the results of the lookups to generate a set of advertisements to be displayed for the user.

In yet another alternate embodiment, information related to each user is contained within multiple segment-based matrices 520, each matrix 520 being assembled based on a set of segment-based attributes in a predetermined period of time (e.g., for gender/demographic attributes, one matrix 520 for young males, one matrix 520 for young females, etc). Thus, the advertising servers 105 must again perform multiple lookups within respective matrices 520 per user search query or web page view in order to extract related advertisements and must further combine the results of the lookups to generate a set of advertisements to be displayed for the user.

Figure 6:
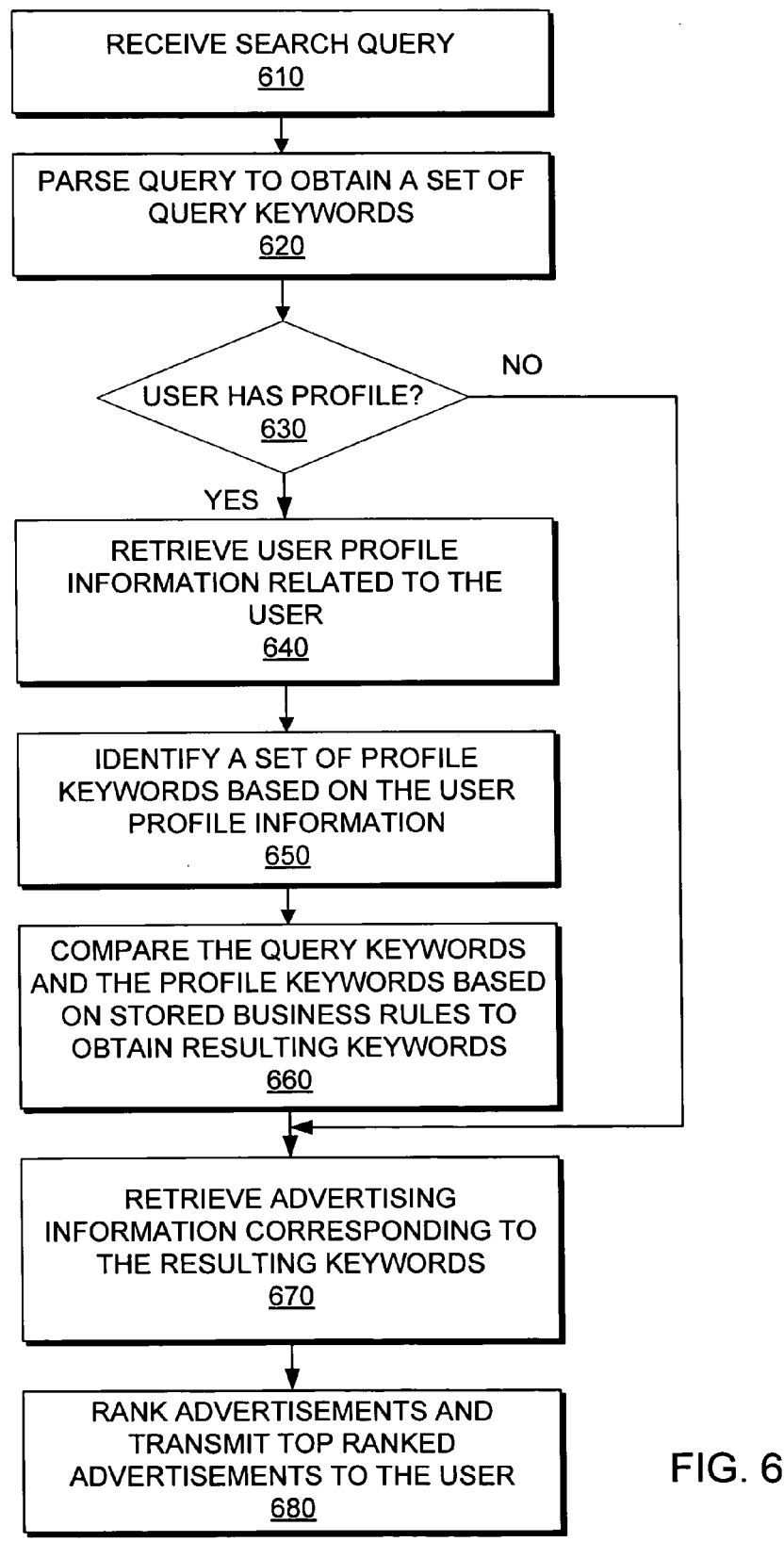
FIG. 6 is a flow diagram illustrating a method to facilitate optimization of targeted advertisements based on user profile information, according to one embodiment of the invention.

FIG. 6 is a flow diagram illustrating a method to facilitate optimization of targeted advertisements based on user profile information, according to one embodiment of the invention. As illustrated in FIG. 6, at processing block 610, an event, such as, for example, a search query is received from a user or an agent of the user. In one embodiment, if the user inputs a search query in a web page displayed in the client program 132 running on the client machine 130 associated with the user, the client machine 130 transmits the search query to the entity 100 via the network 120. The web servers 102 within the entity 100 receive the search query and transmit the query to the processing servers 104.

At processing block 620, the search query is parsed to generate one or more query units, such as, for example, a set of query keywords. In one embodiment, the processing servers 104 parse the search query, to obtain one or more query keywords. For example, if the user intends to search for information about a Madonna tour, and inputs a search query "Madonna tour," the processing servers 104 parse the query and identify a set of single-word and multi-word keywords, such as "Madonna," "tour," and "Madonna tour." The set of query keywords may yield query results and related advertisements related to Madonna music tour information or, in the alternative, query results related to Madonna religious travel tours. Thus, it would be advantageous to modify the set of query keywords based on the user's actual intentions at the time of the query input, as described in detail below.

At processing block 630, a decision is made whether the user has an associated user profile stored within the data storage module 106. In one embodiment, the processing servers 104 access the data storage module 106 and use the user identification information to search for a profile associated with the particular user.

If the user has no profile stored within the data storage module 106, then the procedure jumps to processing block 670, described in detail below. Otherwise, if a user profile is available, then at processing block 640, the profile information related to the user is retrieved from the data storage module 106.

In one embodiment, the processing servers 104 retrieve user profile information from the user database 210 within the data storage module 106, such as, for example, demographic data about the user, geographic data detailing user access locations, and/or behavioral data related to the user, such behavioral data being generated by a behavioral targeting system, which analyzes user events or actions in connection with the entity 100 and identifies interests of the user based on previously analyzed events. In the example presented above, the user database 210 may contain user profile information describing music interests of the user, as evidenced by prior web page views and search queries related to music events.

At processing block 650, a set of profile keywords is identified based on the retrieved user profile information. In one embodiment, the processing servers 104 access the keyword database 220 within the data storage module 106 to retrieve a set of profile keywords linked to the user profile information stored within the user database 210. In an alternate embodiment, the processing servers 104 may access the category database 240 to retrieve a category associated with the user profile information and further access the keyword database 220 to retrieve profile keywords associated with the selected category.

In one embodiment, the processing servers 104 may retrieve "music" and "concert" profile keywords from the keyword database 220, which relate to user's interests in music. In an alternate embodiment, the processing servers 104 may access the category database 240 to retrieve a "Music" category linked to the user profile information and may further access the keyword database 220 to retrieve the "music" and "concert" profile keywords.

At processing block 660, the query keywords and the profile keywords are compared based on stored business rules to obtain a set of resulting keywords. In one embodiment, the processing servers 104 access the business rules database 230 to retrieve predetermined business rules applicable to the comparison between the query keywords and the profile keywords. The processing servers 104 may, for example, retrieve a business rule directed to expand the query keywords to include the retrieved profile keywords, if the query keywords are not revenue-generating, as illustrated by the bid price associated with advertisements targeting the specific query keywords. Alternatively, other applicable business rules may be retrieved from the business rules database 230 and applied by the processing servers 104, without deviating from the spirit or scope of the invention. In our example, the processing servers 104 may decide based on appropriate business rules to expand the set of resulting keywords to include "Madonna," "tour," "music," and "concert."

At processing block 670, advertising information corresponding to the resulting keywords is retrieved from the advertising storage module 108. In one embodiment, the processing servers 104 transmit the set of resulting keywords to the advertising servers 105. The advertising servers 105 access the advertising keyword database 320 and the advertising information database 310 within the advertising storage module 108 and, based on the resulting keywords received from the processing servers 104, retrieve advertisements corresponding to the resulting keywords from the advertising information database 310. In an alternate embodiment, if there is no user profile information, the advertising servers 105 use the set of query keywords as the resulting keywords to retrieve the related advertisements.

Finally, at processing block 680, the retrieved advertisements are ranked and the top ranked advertisements are transmitted to the user via the web servers 102 and the network 120 to be displayed together with the query results on the client program 132. In one embodiment, the advertising servers 105 rank the retrieved advertisement according to one or more parameters stored within the optimization parameter database 330, such as, for example, a bid price associated with each advertisement and provided by the advertiser entities 140, and select a predetermined number of top ranked advertisements. The advertising servers 105 then transmit the top ranked advertisements to the web servers 102 for further transmission to the user.

Figure 7:
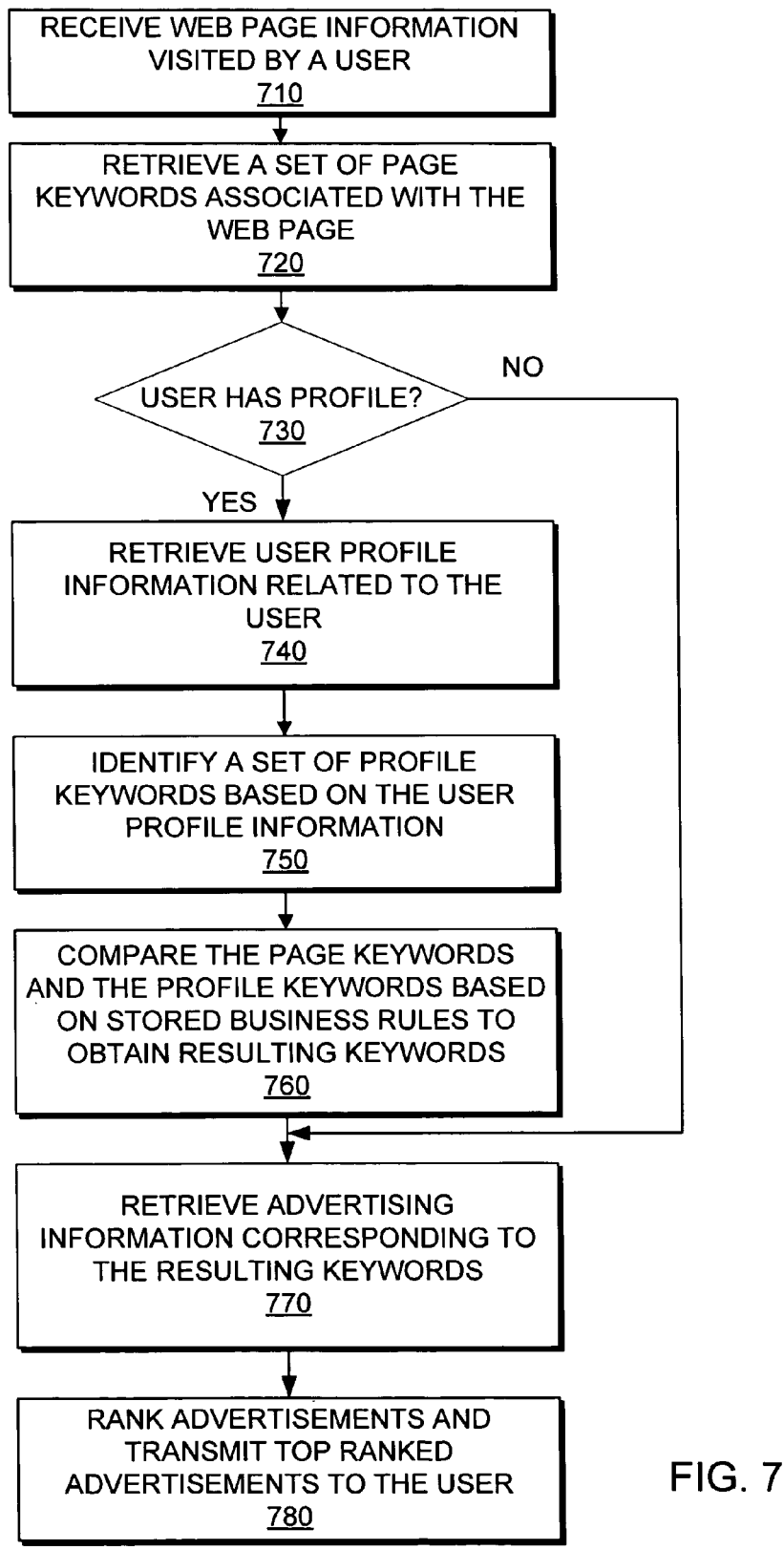
FIG. 7 is a flow diagram illustrating a method to facilitate optimization of targeted advertisements based on user profile information, according to an alternate embodiment of the invention.

FIG. 7 is a flow diagram illustrating a method to facilitate optimization of targeted advertisements based on user profile information, according to an alternate embodiment of the invention. As illustrated in FIG. 7, at processing block 710, an event, such as, for example, a web page view is received from a user or an agent of the user. In one embodiment, if the user accesses a web page displayed in the client program 132 running on the client machine 130 associated with the user, the client machine 130 transmits the web page information to the entity 100 via the network 120. The web servers 102 within the entity 100 receive the web page information and forward the web page information to the processing servers 104.

At processing block 720, the web page is parsed to generate one or more units, such as, for example, a set of page keywords. In one embodiment, the processing servers 104 parse the content of the web page to obtain one or more page keywords. For example, if the user accesses a music-related web page about recent events in the music arena, the processing servers 104 parse the content on the web page and identify a set of single-word and multi-word keywords, such as "concerts," and "CD," and "music charts," for example. It would be advantageous to modify the set of page keywords based on the user's actual intentions at the time of the web page viewing, as described in detail below.

At processing block 730, a decision is made whether the user has an associated user profile stored within the data storage module 106. In one embodiment, the processing servers 104 access the data storage module 106 and use the user identification information to search for a profile associated with the particular user.

If the user has no profile stored within the data storage module 106, then the procedure jumps to processing block 770, described in detail below. Otherwise, if a user profile is available, then at processing block 740, the profile information related to the user is retrieved from the data storage module 106.

In one embodiment, the processing servers 104 retrieve user profile information from the user database 210 within the data storage module 106, such as, for example, demographic data about the user, geographic data detailing user access locations, and/or behavioral data related to the user, such behavioral data being generated by a behavioral targeting system, which analyzes user events or actions in connection with the entity 100 and identifies interests of the user based on previously analyzed events. In the example presented above, the user database 210 may contain user profile information describing music interests of the user, as evidenced by prior web page views related to the singer Madonna and prior ticket purchase transactions related to music tour events.

At processing block 750, a set of profile keywords is identified based on the retrieved user profile information. In one embodiment, the processing servers 104 access the keyword database 220 within the data storage module 106 to retrieve a set of profile keywords linked to the user profile information stored within the user database 210. In an alternate embodiment, the processing servers 104 may access the category database 240 to retrieve a category associated with the user profile information and further access the keyword database 220 to retrieve profile keywords associated with the selected category.

In one embodiment, the processing servers 104 may retrieve "Madonna" and "tour" profile keywords from the keyword database 220, which relate to the above user's interests in music. In an alternate embodiment, the processing servers 104 may access the category database 240 to retrieve a "Music" category linked to the user profile information and may further access the keyword database 220 to retrieve the "Madonna" and "tour" profile keywords.

At processing block 760, the page keywords and the profile keywords are compared based on stored business rules to obtain a set of resulting keywords. In one embodiment, the processing servers 104 access the business rules database 230 to retrieve predetermined business rules applicable to the comparison between the query keywords and the profile keywords. The processing servers 104 may, for example, retrieve a business rule directed to expand the query keywords to include the retrieved profile keywords, if the query keywords are not revenue-generating, as illustrated by the bid price associated with advertisements targeting the specific query keywords. In our example, the processing servers 104 may decide based on appropriate business rules to expand the set of resulting keywords to include "Madonna," "tour," "concerts," and "CD."

At processing block 770, advertising information corresponding to the resulting keywords is retrieved from the advertising storage module 108. In one embodiment, the processing servers 104 transmit the set of resulting keywords to the advertising servers 105. The advertising servers 105 access the advertising keyword database 320 and the advertising information database 310 within the advertising storage module 108 and, based on the resulting keywords received from the processing servers 104, retrieve advertisements corresponding to the resulting keywords from the advertising information database 310. In an alternate embodiment, if there is no user profile information, the advertising servers 105 use the set of page keywords as the resulting keywords to retrieve the related advertisements.

Finally, at processing block 780, the retrieved advertisements are ranked and the top ranked advertisements are transmitted to the user via the web servers 102 and the network 120 to be displayed on the client program 132. In one embodiment, the advertising servers 105 rank the retrieved advertisements according to one or more parameters stored within the optimization parameter database 330, such as, for example, a bid price associated with each advertisement and provided by the advertiser entities 140, and select a predetermined number of top ranked advertisements. The advertising servers 105 then transmit the top ranked advertisements to the web servers 102 for further transmission to the user.

Figure 8:
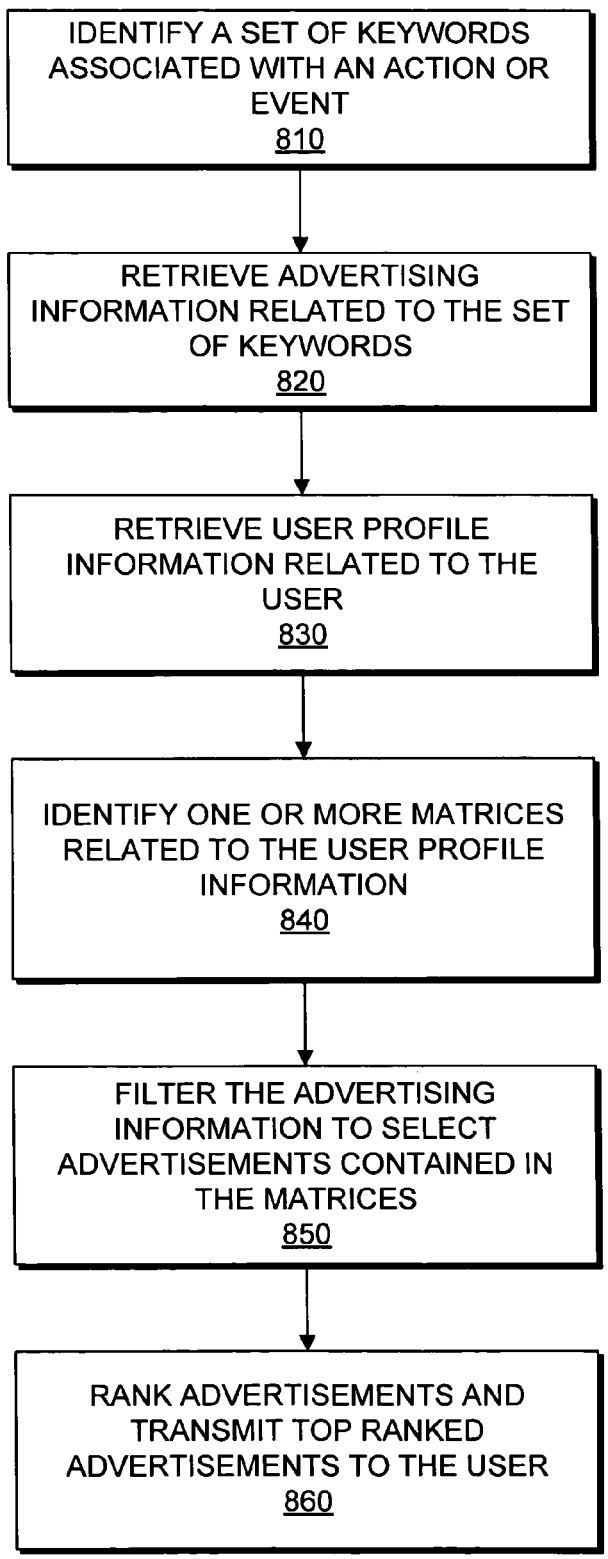
FIG. 8 is a flow diagram illustrating a method to facilitate optimization of targeted advertisements based on user profile information, according to another alternate embodiment of the invention.

FIG. 8 is a flow diagram illustrating a method to facilitate optimization of targeted advertisements based on user profile information, according to another alternate embodiment of the invention. As illustrated in FIG. 8, at processing block 810, a set of event keywords associated with an action or event performed by a user or an agent of the user is identified. In one embodiment, the entity 100 receives an event or action performed by the user, such as, for example, either a search query input by the user or a web page accessed by the user. The processing servers 104 within the entity 100 identify event keywords related to the received event or action, such as, for example, query keywords in the case of a search query, or page keywords derived from content available on the web page viewed by the user.

At processing block 820, advertising information related to each of the keywords within the set of event keywords is retrieved. In one embodiment, the processing servers 104 transmit the event keywords to the advertising servers 105 within the entity 100. The advertising servers 105 access the advertising storage module 108 to retrieve multiple advertisements corresponding to each of the received event keywords.

At processing block 830, user profile information is retrieved from the data storage module 106. In one embodiment, the processing servers 104 retrieve user profile information from the user database 210 within the data storage module 106, such as, for example, demographic data about the user, geographic data detailing user access locations, gender data, and/or behavioral data related to the user, such behavioral data being generated by a behavioral targeting system, which analyzes user events or actions in connection with the entity 100 and identifies interests of the user based on previously analyzed events.

At processing block 840, one or more matrices corresponding to the user profile information are identified. In one embodiment, the processing servers 104 transmit the user profile information to the advertising servers 105. The advertising servers 105 receive the profile information and access the optimization parameter database 330 within the advertising storage module 108 to retrieve one or more matrices related to the user, such as user matrices 510, segment-based matrices 520 and/or time-based matrices 530, as detailed above in connection with FIGS. 5A and 5B.

At processing block 850, the advertising information related to the event keywords is further filtered to select advertisements contained in the identified matrices. In one embodiment, the advertising servers 105 search the identified matrices 510, 520, 530 to select only the sponsored advertisements present in the matrices, which correspond to the specific event keywords.

Finally, at processing block 860, the selected advertisements are ranked and the top ranked advertisements are transmitted to the user via the web servers 102 and the network 120 to be displayed on the client program 132. In one embodiment, the advertising servers 105 rank the selected advertisements according to the bid price and the click-through-rate parameters associated with each advertisement, and previously stored within the identified matrices, and further select a predetermined number of top ranked advertisements. The advertising servers 105 then transmit the top ranked advertisements to the web servers 102 for further transmission to the user.

Figure 9:
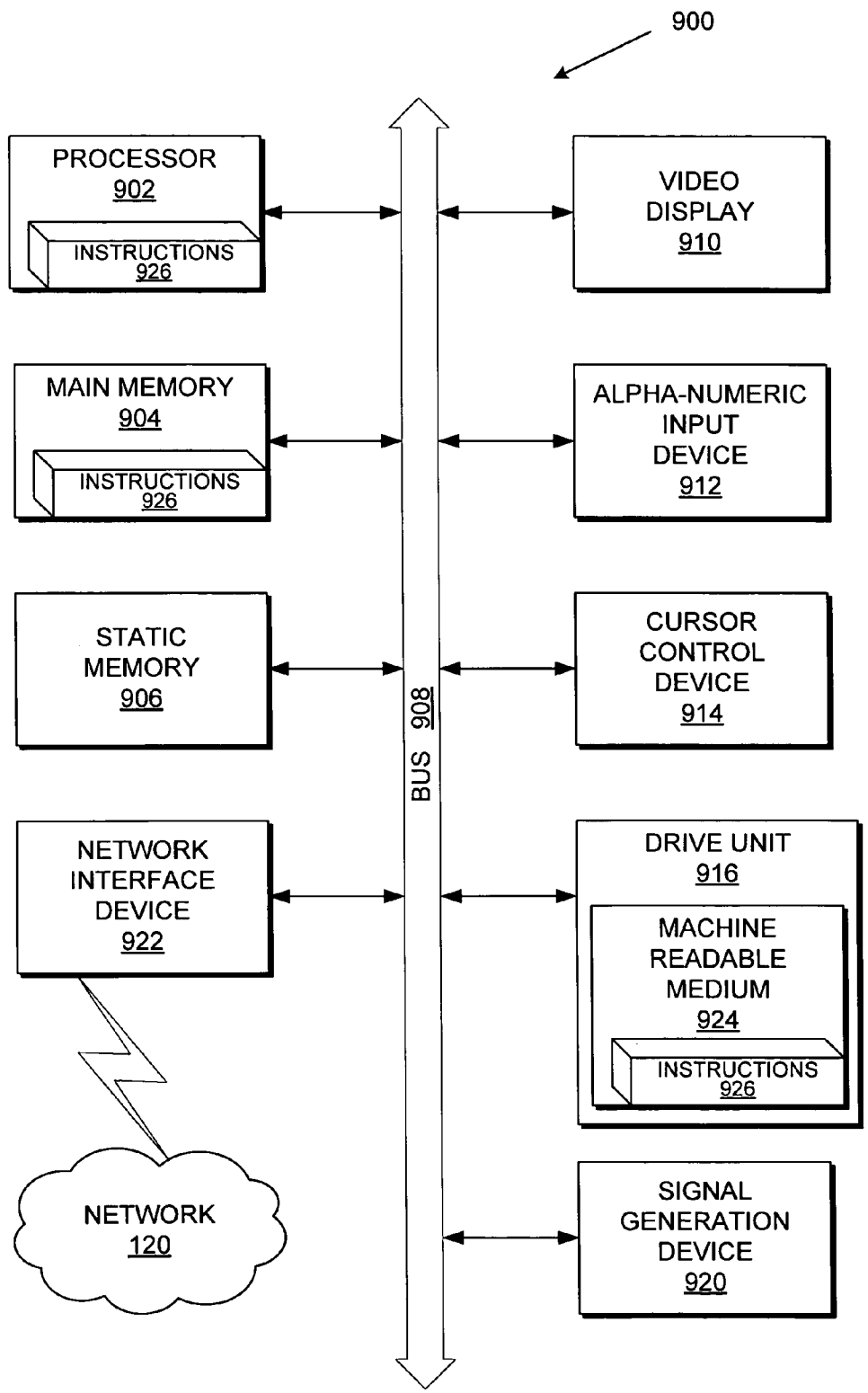
FIG. 9 is a diagrammatic representation of a machine in the exemplary form of a computer system within which a set of instructions may be executed.

FIG. 9 shows a diagrammatic representation of a machine in the exemplary form of a computer system 900 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 924 on which is stored a set of instructions (i.e., software) 926 embodying any one, or all, of the methodologies described above. The software 926 is also shown to reside, completely or at least partially, within the main memory 904 and/or within the processor 902. The software 926 may further be transmitted or received via the network interface device 920.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method of targeting based on user information, the method comprising:
   identifying a set of keywords associated with content information requested by a user over a network;
   retrieving advertising information corresponding to said set of keywords;
   retrieving user profile information associated with said user, said user profile information comprising a user matrix, said user matrix comprises, for said set of keywords and said corresponding advertising information, click-through-rates associated with said user and a bid price for said advertising information;
   filtering said advertising information to select advertisements based on said bid price for said advertising information and said corresponding click-through-rate associated with said user identified in said user matrix for said set of keywords; and
   providing said advertising information selected to be displayed for said user in connection with said content information.

2. The method according to claim 1, wherein said identifying further comprises:
   receiving a search query from said user; and
   parsing said query to retrieve said set of keywords.

3. The method according to claim 1, wherein said identifying further comprises:
   receiving web page information associated with a web page accessed by said user; and
   retrieving said set of keywords from said web page information.

4. The method according to claim 1, wherein said providing further comprises:
   retrieving advertising information corresponding to said set of resulting keywords;
   ranking advertisements within said advertising information based on at least one parameter; and
   transmitting a predetermined number of top ranked advertisements to said user.

5. The method according to claim 1, wherein said providing further comprises:
   ranking said selected advertisements based on at least one parameter; and
   transmitting a predetermined number of top ranked advertisements to said user.

6. A system for targeting based on user information, the system comprising:
   at least one processing server, comprising a processor and memory, to identify a set of keywords associated with content information requested by a user over a network, to retrieve advertising information corresponding to said set of keywords to retrieve a user profile information associated with said user, said user profile information comprising a user matrix, said user matrix comprises, for said set of keywords and said corresponding advertising information, click-through-rates associated with said user and a bid price for said advertising information; and
   at least one advertising server, comprising a processor and memory, coupled to said at least one processing server to filter said advertising information to select advertisements based on said bid price for said advertising information and said corresponding click-through-rate associated with said user identified in said user matrix for said set of keywords and to provide advertising information selected to be displayed for said user in connection with said content information.

7. The system according to claim 6, wherein said at least one processing server further receives a search query from said user and parses said query to retrieve said set of keywords.

8. The system according to claim 6, wherein said at least one processing server further receives web page information associated with a web page accessed by said user and retrieves said set of keywords from said web page information.

9. The system according to claim 6, wherein said at least one advertising server further retrieves advertising information corresponding to said set of resulting keywords, ranks advertisements within said advertising information based on at least one parameter, and transmits a predetermined number of top ranked advertisements to said user.

10. The system according to claim 6, wherein said at least one advertising server further ranks said selected advertisements based on at least one parameter, and transmits a predetermined number of top ranked advertisements to said user.

11. A computer readable medium for storing executable instructions, which, when executed in a processing system, cause said processing system to perform targeting, the instructions for:
   identifying a set of keywords associated with content information requested by a user over a network;
   retrieving advertising information corresponding to said set of keywords;
   retrieving user profile information associated with said user, said user profile information comprising a user matrix, said user matrix comprises, for said set of keywords and said corresponding advertising information, click-through-rates associated with said user and a bid price for said advertising information;
   filtering said advertising information to select advertisements based on said bid price for said advertising information and said corresponding click-through-rate associated with said user identified in said user matrix for said set of keywords; and providing said advertising information selected to be displayed for said user in connection with said content information.

12. The computer readable medium according to claim 11, wherein said instructions for identifying further comprises instructions for:

receiving a search query from said user; and parsing said query to retrieve said set of keywords.

13. The computer readable medium according to claim 11, wherein said instructions for identifying further comprises instructions for:

receiving web page information associated with a web page accessed by said user; and retrieving said set of keywords from said web page information.

14. The computer readable medium according to claim 11, wherein said instructions for providing further comprises instructions for:

retrieving advertising information corresponding to said set of resulting keywords;

ranking advertisements within said advertising information based on at least one parameter; and transmitting a predetermined number of top ranked advertisements to said user.

\* \* \* \* \*